US008310722B2

(12) United States Patent
Schulmeister

(10) Patent No.: US 8,310,722 B2
(45) Date of Patent: Nov. 13, 2012

(54) METHOD FOR ACTUATING AN INKJET PRINTING DEVICE

(75) Inventor: Peter Schulmeister, Pfaffenhofen (DE)

(73) Assignee: manroland AG, Offenbach am Main (DE)

( * ) Notice: Subject to any disclaimer, the term of this patent is extended or adjusted under 35 U.S.C. 154(b) by 352 days.

(21) Appl. No.: 12/668,163

(22) PCT Filed: Jul. 8, 2008

(86) PCT No.: PCT/EP2008/005558
§ 371 (c)(1),
(2), (4) Date: Jan. 7, 2010

(87) PCT Pub. No.: WO2009/007092
PCT Pub. Date: Jan. 15, 2009

(65) Prior Publication Data

US 2010/0208281 A1 Aug. 19, 2010

(30) Foreign Application Priority Data

Jul. 9, 2007 (DE) ........................ 10 2007 032 004

(51) Int. Cl.
*H04N 1/60* (2006.01)

(52) U.S. Cl. ........... 358/1.9; 358/3.26; 358/3.27; 347/2; 347/9; 347/16; 347/20; 347/75

(58) Field of Classification Search ........................ None
See application file for complete search history.

(56) References Cited

U.S. PATENT DOCUMENTS

| | | | | |
|---|---|---|---|---|
| 4,673,951 | A | 6/1987 | Mutoh et al. | |
| 5,801,722 | A * | 9/1998 | Ueda et al. | 347/16 |
| 5,906,156 | A | 5/1999 | Shibuya et al. | |
| 6,580,520 | B1 * | 6/2003 | Teradaira et al. | 358/1.15 |
| 7,497,163 | B2 * | 3/2009 | Roth | 101/485 |
| 7,697,172 | B2 * | 4/2010 | Ikeno et al. | 358/474 |
| 7,988,276 | B2 * | 8/2011 | Nakazawa et al. | 347/100 |
| 2003/0035021 | A1 * | 2/2003 | Masuyama et al. | 347/40 |
| 2003/0095158 | A1 * | 5/2003 | Akitaya et al. | 347/14 |
| 2004/0141021 | A1 * | 7/2004 | Yamamoto et al. | 347/16 |
| 2005/0078139 | A1 * | 4/2005 | Kang et al. | 347/19 |
| 2006/0039629 | A1 * | 2/2006 | Li et al. | 382/289 |
| 2006/0132517 | A1 * | 6/2006 | Vinas | 347/9 |
| 2007/0024667 | A1 * | 2/2007 | Kim | 347/41 |

FOREIGN PATENT DOCUMENTS

| | | |
|---|---|---|
| JP | 3-108547 | 5/1991 |

* cited by examiner

*Primary Examiner* — Dung Tran
(74) *Attorney, Agent, or Firm* — Cozen O'Connor

(57) ABSTRACT

A method for actuating an inkjet printing device that operates in accordance with the continuous inkjet principle to place a printing image, which printing image is to be printed by way of the inkjet printing device, on a printing material, where the inkjet printing device provides printing ink droplets at a defined droplet generation frequency, and where the position of the printing material which is to be printed relative to the inkjet printing device is monitored with the aid of a sensor, i.e., an encoder, to generate an actuating signal for the inkjet printing device.

8 Claims, 5 Drawing Sheets

13
21
27
23
25
20
26
22
13
24
18
19
28

-- PRIOR ART --

METHOD FOR ACTUATING AN INKJET PRINTING DEVICE

CROSS-REFERENCE TO RELATED APPLICATIONS

This is a U.S. national stage of International Application No. PCT/EP2008/005558, filed on 8 Jul. 2008. Priority is claimed on German Application No. 10 2007 032 004.5, filed on 9 Jul. 2007.

BACKGROUND OF THE INVENTION

1. Field of the Invention

The present invention is directed to inkjet printers and, more particularly, to a method for controlling an inkjet printing device operating in accordance with the continuous inkjet principle.

2. Description of the Related Art

Inkjet printing devices which do not use printing plates are increasingly used in plate-based printing presses, mainly printing presses working on the principle of offset printing, e.g., in web-fed rotary offset printing presses and sheet-fed printing presses. These plateless inkjet printing devices are used in-line with offset printing particularly for individualizing printed products produced by offset printing, such as with barcodes, numbering or other markings. Inkjet printing devices of this kind have at least one inkjet printing head.

Inkjet printing devices working according to the continuous inkjet principle supply ink droplets at a defined, constant droplet-generating frequency usually on the order of magnitude of between 10 Hz and several hundred kHz. In order to control an inkjet printing device working in accordance with the continuous inkjet principle such that a print image to be printed by the inkjet printing device is exactly positioned on a substrate to be imprinted, the movement of the substrate is monitored by a sensor. The monitoring is typically performed by a displacement transducer designed as an encoder, and the signal supplied by the sensor is used, according to the prior art, to control the inkjet printing device. The frequency of the signal supplied by the sensor, particularly by the encoder, depends on the transporting speed of the substrate to be imprinted.

Accordingly, in practice, there are two frequencies which are independent from one another, i.e., on the one hand, the droplet generating frequency of the inkjet printing device and, on the other hand, the frequency of the signal supplied by the sensor which is obtained from monitoring the movement of the substrate to be imprinted. A good printing quality can be provided at a low transporting speed of the substrate, i.e., when the droplet generating frequency is greater than the frequency of the signal supplied by the sensor. On the other hand, when the transporting speed of the substrate to be imprinted is high, i.e., when the droplet generating frequency is approximately on the order of the frequency of the signal supplied by the sensor, interference effects or beat effects can occur in the print image which are visible as light or dark fringes or stripes in the print image to be printed by the inkjet printing device and which impair the printing quality. Up to the present time, there has been no known method for controlling an inkjet printing device operating according to the continuous inkjet principle which remedies this problem.

SUMMARY OF THE INVENTION

It is therefore an object of the present invention to provide a method for controlling an inkjet printing device. This and other objects and advantages are achieved by a method in accordance with the invention in which the absolute position of the substrate is monitored by a sensor, and when the sensor detects the start of a substrate zone to be imprinted with a relatively high printing quality, the actuating signal of the inkjet printing device for the subsequent substrate zone to be imprinted with the relatively high printing quality is coupled with the droplet generating frequency. In addition, when the sensor detects the end of a substrate zone to be imprinted with the relatively high printing quality, the actuating signal of the inkjet printing device for the subsequent substrate zone which is not to be imprinted or which is to be imprinted with a relatively low printing quality is coupled with the sensor signal.

In an embodiment, print image data which are screened with different resolutions are supplied for each substrate area to be imprinted, and, depending on the speed of the substrate to be imprinted, print image data which are screened with a determined resolution for the respective speed are used for printing, and the resolution of the sensor is adjusted to the resolution of the screened print image data.

The embodiments of the method in accordance with the invention can prevent the formation of stripes in the print image to be printed which result from interference effects and beat effects between the droplet generating frequency and the frequency of the sensor signal representing the movement of the substrate to be imprinted. As a result, achievable printing quality can be increased.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are indicated in the subclaims and the following description. Embodiment examples of the invention are described more fully with reference to the drawings, The drawings show in which:

DETAILED DESCRIPTION OF THE PREFERRED EMBODIMENTS

The disclosed embodiments of the invention are directed to a method for controlling an inkjet printing device working in accordance with the continuous inkjet principle in order to position a print image to be printed by the inkjet printing device exactly on a substrate.

Figure 1:
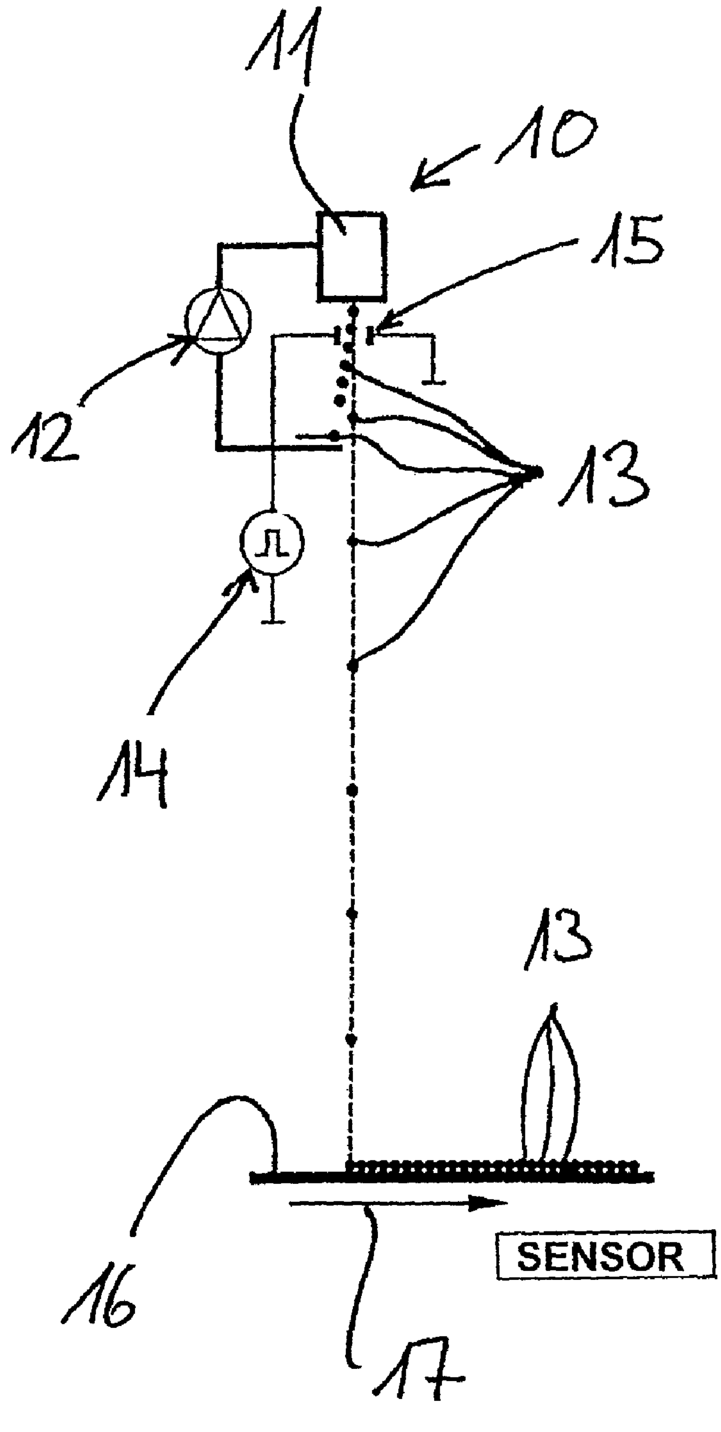
FIG. 1 is a schematic view of an inkjet printing device.

The working principle of an inkjet printing device 10 operating according to the continuous inkjet principle is shown in FIG. 1 in a highly simplified manner. An inkjet printing device 10 of this kind comprises a droplet generator 11 which is connected to an ink circulation system 12 and which supplies ink droplets 13 at a defined, constant droplet generating frequency. An electric field present at a capacitor 15 is influenced by an imaging signal 14 to adjust the quantity of inkjet droplets 13 which are supplied by the droplet generator 11 and which are to be applied to a substrate 16 to be imprinted. Ink droplets 13 of the kind mentioned above which are not intended to reach the substrate 16 to be imprinted are deflected by the electric field at the capacitor 15 and are returned to the ink circulation system 12.

Accordingly, in an inkjet printing device operating in accordance with the continuous inkjet principle a uniform flow of small ink droplets is generated with a constant droplet generating frequency. The ink droplets either reach the substrate 16 to be imprinted or are returned to the ink circulation 12 depending on the imaging signal 14.

In order to accurately position ink droplets 13 on the substrate, the movement or transporting of the substrate 13 which is moved in direction of arrow 17 depicted in FIG. 1 is monitored by a sensor which is typically designed as an encoder. The frequency of the signal supplied by the sensor, particularly by the encoder; depends on the transporting speed of the substrate 16. When this signal supplied by the sensor is exclusively used for controlling the inkjet printing device 10 working according to the continuous inkjet principle, interference and beating which are visible as stripes in the print image to be printed with the inkjet printing device may occur particularly when the droplet generating frequency is on the order of magnitude of the frequency of the signal supplied by the sensor.

The disclosed embodiments of the invention provide a method for controlling an inkjet printing device working according to the continuous inkjet principle by which the formation of the stripes mentioned above can be prevented.

A method according to the invention according to an embodiment of the present invention is described in the following with reference to FIG. 2

Figure 2:
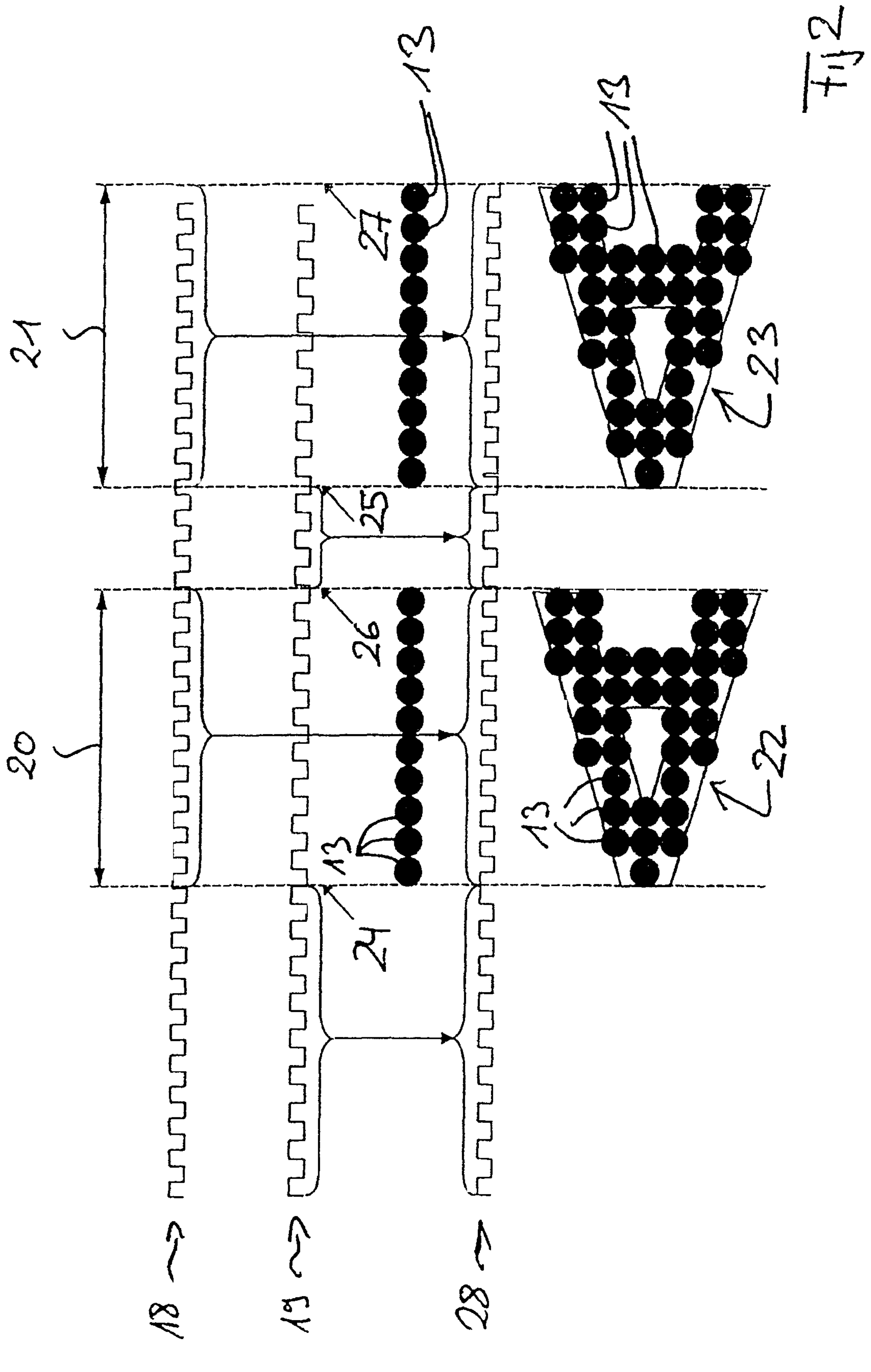
FIG. 2 is a schematic diagram illustrating the method according to the invention for controlling an inkjet printing device according to a first aspect of the invention.

FIG. 2 shows the temporal progression of several signals, i.e., as first signal 18, a signal of an inkjet printing device to be controlled, which signal corresponds to the constant droplet generating frequency, and, as second signal 19, a signal supplied by a sensor which serves for monitoring the substrate to be imprinted, where the frequency of the signal supplied by the sensor 19 depends on the speed of the substrate to be imprinted.

Further, two substrate zones 20 and 21 to be imprinted on the substrate to be imprinted are shown schematically. In each of these substrate zones 20 and 21 to be imprinted according to FIG. 2, an "A" is to be printed as print image 22 and 23 with a relatively high printing quality. The start of the substrate zone 20 to be imprinted with relatively high printing quality is indicated by an arrow 24, and the start of the substrate zone 21 to be imprinted with relatively high printing quality is indicated by arrow 25. On the other hand, the end of the substrate zone 20 to be imprinted with relatively high printing quality is indicated by arrow 26, and the end of the substrate zone 21 to be imprinted with relatively high printing quality is indicated by arrow 27. The substrate zone 20 to be imprinted with relatively high printing quality accordingly extends between the start 24 and the end 26 thereof. The substrate zone 21 which is likewise to be imprinted with relatively high printing quality extends between the start 25 and the end 27 thereof.

A substrate zone which is not to be imprinted or, alternatively, a substrate zone to be imprinted with a relatively low printing quality is situated between the end 26 of the substrate zone 20 to be imprinted with relatively high printing quality and the start 25 of the substrate zone 21 to be imprinted with relatively high printing quality. A substrate zone which is not to be imprinted or, alternatively, a substrate zone to be imprinted with a relatively low printing quality is situated before the start 24 of the substrate zone 20 to be imprinted and after the end 27 of the substrate zone 21 to be imprinted.

Within the context of the method in accordance with the contemplated embodiment of the invention, the sensor, in particular the encoder, serves to monitor the absolute position of the substrate. When the sensor detects the start of a substrate zone to be imprinted with a relatively high printing quality, an actuating signal 28 for controlling the inkjet printing device working according to the continuous inkjet principle for the subsequent substrate zone to be imprinted with relatively high printing quality is coupled with the droplet generating frequency and, therefore, with the signal 18. On the other hand, when the sensor generates the end of a substrate zone to be imprinted with a relatively high printing quality the actuating signal 28 of the inkjet printing device for the subsequent substrate zone which is not to be imprinted or which is to be imprinted with a relatively low printing quality is coupled with sensor signal 19.

This is indicated in FIG. 2 by brackets. For example, it can be seen from FIG. 2 that the actuating signal 28 of the inkjet printing device for the substrate zones 20, 21 to be imprinted with relatively high printing quality is coupled with signal 18, and with signal 19 for the substrate zones not to be imprinted or for the substrate zone to be imprinted with relatively low printing quality. Signal 28 for controlling the inkjet printing device is accordingly composed, portion to portion, either of the signal 18 of the droplet generating frequency or of the signal 19 supplied by the sensor.

In this way, it is ensured that an equidistant sequence of droplets 13 reaches the substrate to be imprinted in each substrate zone to be imprinted with relatively high printing quality. The formation of stripes in the print image to be applied with the inkjet printing device can be prevented in this way.

In accordance with an advantageous aspect of the presently contemplated embodiment of the method of the invention, the actuating signal of the inkjet printing device is coupled with the droplet generating frequency for every substrate zone of the substrate to be imprinted with relatively high printing quality such that the frequency of the actuating signal corresponds to the droplet generating frequency. According to a another alternative embodiment, the actuating signal is coupled with the droplet generating frequency such that the frequency of the actuating signal is coupled with the droplet generating frequency by a unit fraction ratio. According to yet another alternative embodiment of the present invention, the actuating signal of the inkjet printing device for each substrate zone to be imprinted with relatively high printing quality is coupled with the droplet generating frequency in such a way that the frequency of the actuating signal is coupled with the droplet generating frequency by a ratio of a proper fraction.

In the presently contemplated embodiments of the invention unit fraction ratio means a ratio of 1:2 or 1:3 or 1:4 or 1:N, where N is a whole number. A ratio of a proper fraction means a ratio of 2:3 or 3:4 or 4:5 or X:Y, where X and Y are different whole numbers not equal to 1.

For each substrate zone which is not to be imprinted or each substrate zone to be imprinted with relatively low printing quality, the actuating signal of the inkjet printing device is coupled with the sensor signal such that the frequency of the actuating signal of the inkjet printing device corresponds to the frequency of the sensor signal.

As a result, the frequency of the actuating signal is synchronized with the droplet generating frequency for each substrate area of a substrate that is to be imprinted with the relatively high printing quality. The signal supplied by the sensor serves to determine the absolute position of the start and end of the substrate zones to be imprinted.

Any positioning errors which may occur are compensated in substrate zones which are not to be imprinted or in substrate zones to be imprinted with low printing quality.

When printing text, for example, it can be ensured with the presently contemplated embodiment of the method of the invention that in droplets are always positioned equidistantly considered in the transporting direction of the substrate to be imprinted when printing lines of text. Positioning errors are summed and compensated in the space between lines, i.e., of a substrate zone which is not to be imprinted.

Interference fringes which impair the printing quality are relocated to substrate zones which are not to be imprinted or substrate zones which are to be imprinted with low printing quality. The scaling is unimpaired over the entire printing length. Changes in the transporting speed of the substrate result in very small changes in size which are invisible to the human eye and accordingly do not impair printing quality.

Figure 3:
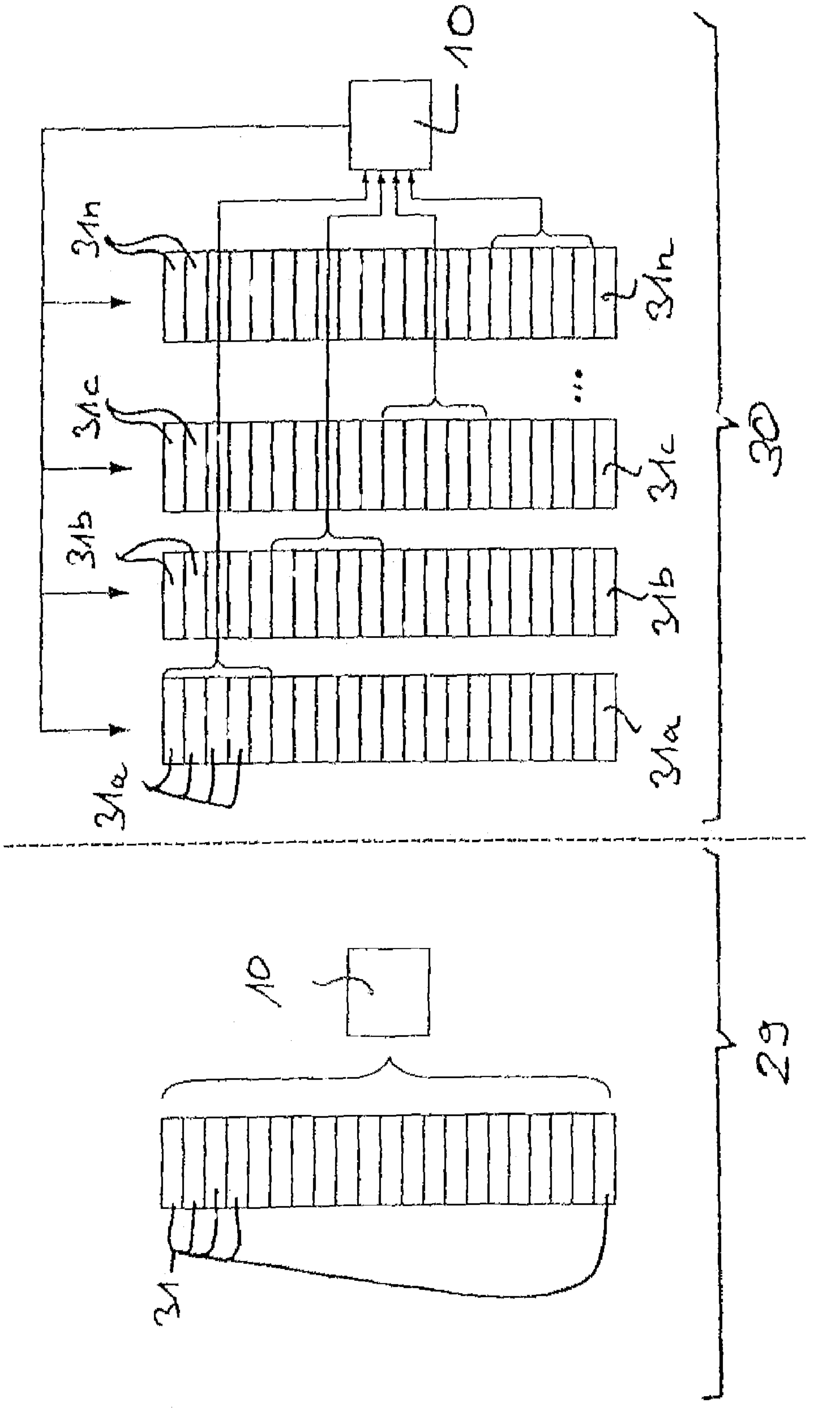
FIG. 3 is a schematic diagram illustrating the method according to the invention for controlling an inkjet printing device according to a second aspect of the invention.

A method according to the invention according to another embodiment of the present invention is described in the following with reference to FIG. 3. The left-hand side 29 of FIG. 3 relates to the prior art, while the right-hand side 30 of FIG. 3 relates to the method according to the invention according to the presently contemplated embodiment of the invention.

According to the prior art (left-hand side 29 of FIG. 3), a plurality of data sets 31 are kept available for controlling an inkjet printing device. The data sets 31 are print image data which are screened with a defined resolution in a raster image processor. The resolution of the screening of the data sets 31 is adjusted to the resolution of the signal of the sensor which serves for monitoring the position of the substrate to be imprinted. As mentioned above, unwanted stripes caused by interference between the droplet generating frequency of the inkjet printing device 10 and the frequency of the signal supplied by the sensor may form in the substrate due to changes in the printing speed or transporting speed of the substrate.

In accordance with the contemplated embodiment of the invention (see right-hand side 30 in FIG. 3), a plurality of print image data sets 31*a*, 31*b*, 31*c* to 31*n* which are screened at different resolutions in the raster image processor are kept available for controlling the inkjet printing device 10, each of these raster resolutions being adjusted to a determined printing speed or transporting speed of the substrate.

Accordingly, print image data sets screened at different resolutions are kept available for every print image and, depending on the speed of the substrate to be imprinted, a print image data set which is screened at a determined resolution for the respective speed is used for printing. Accordingly, that print image data set by which the print image to be printed can best be reproduced at the current speed of the substrate is used for printing. Here, it is important that the resolution of the sensor, particularly of the encoder, is adapted to the resolution of the screened print image data.

Accordingly, in the event of a change in the transporting speed of the substrate, a print image set with a changed resolution is used for printing on the one hand and the resolution of the sensor is adapted to the resolution of the screened print image data sets on the other hand. In addition, disruptive interference conditions in the print image to be printed with the inkjet printing device can be eliminated.

Accordingly, the selection of a suitable print image data set and the selection of the resolution of the sensor is performed depending on the transporting speed of the substrate which is acquired by measurement techniques or is determined computationally from other measured values.

Figure 4:
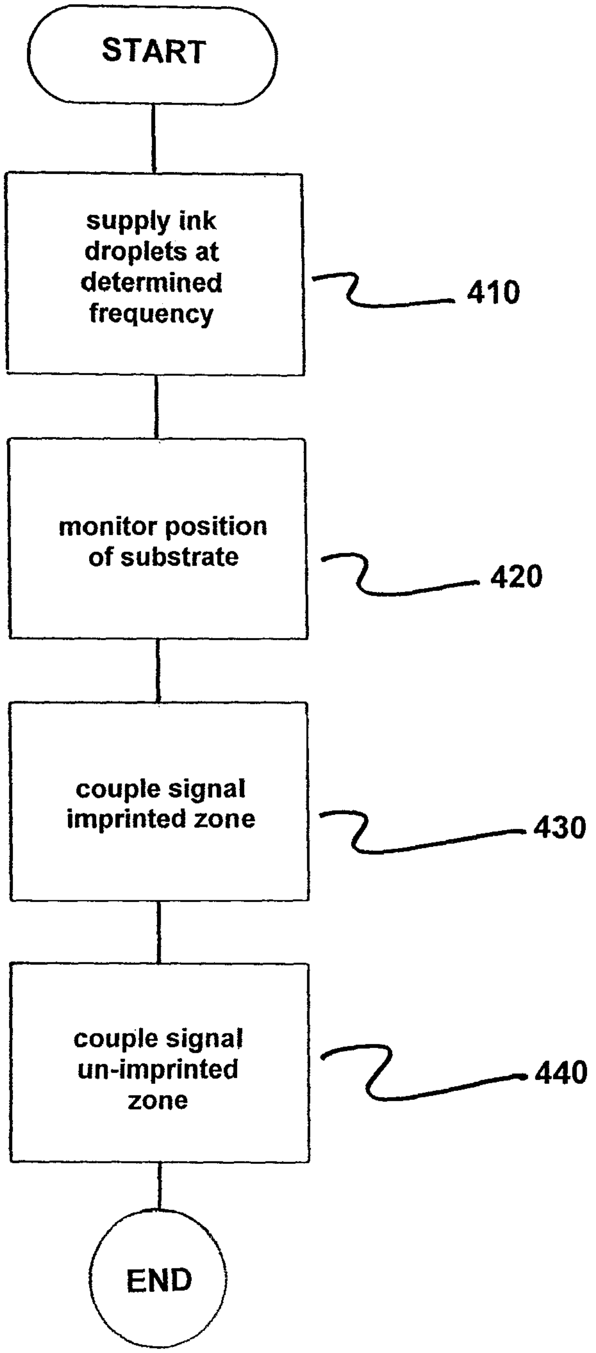
FIG. 4 is a flow chart of the method in accordance with an embodiment of the invention.

FIG. 4 is a flow chart of the method in accordance with an embodiment of the invention. Initially, ink droplets are supplied at a determined droplet generating frequency from the inkjet printing device, as indicated in step 410. A position of the substrate to be imprinted relative to the inkjet printing device is monitored at a sensor to generate an actuating signal for the inkjet printing device, as indicated in step 420. The actuating signal of the inkjet printing device for a subsequent substrate zone to be imprinted with a relatively high printing quality is coupled with the droplet generating frequency upon detecting at the sensor a start of a substrate zone to be imprinted with a relatively high printing quality, as indicated in step 430. The actuating signal of the inkjet printing device for the subsequent substrate zone which is not to be imprinted or the substrate zone which is to be imprinted with a relatively low printing quality is coupled with the sensor signal when the sensor detects an end of the substrate zone to be imprinted with the relatively high printing quality, as indicated in step 440.

Figure 5:
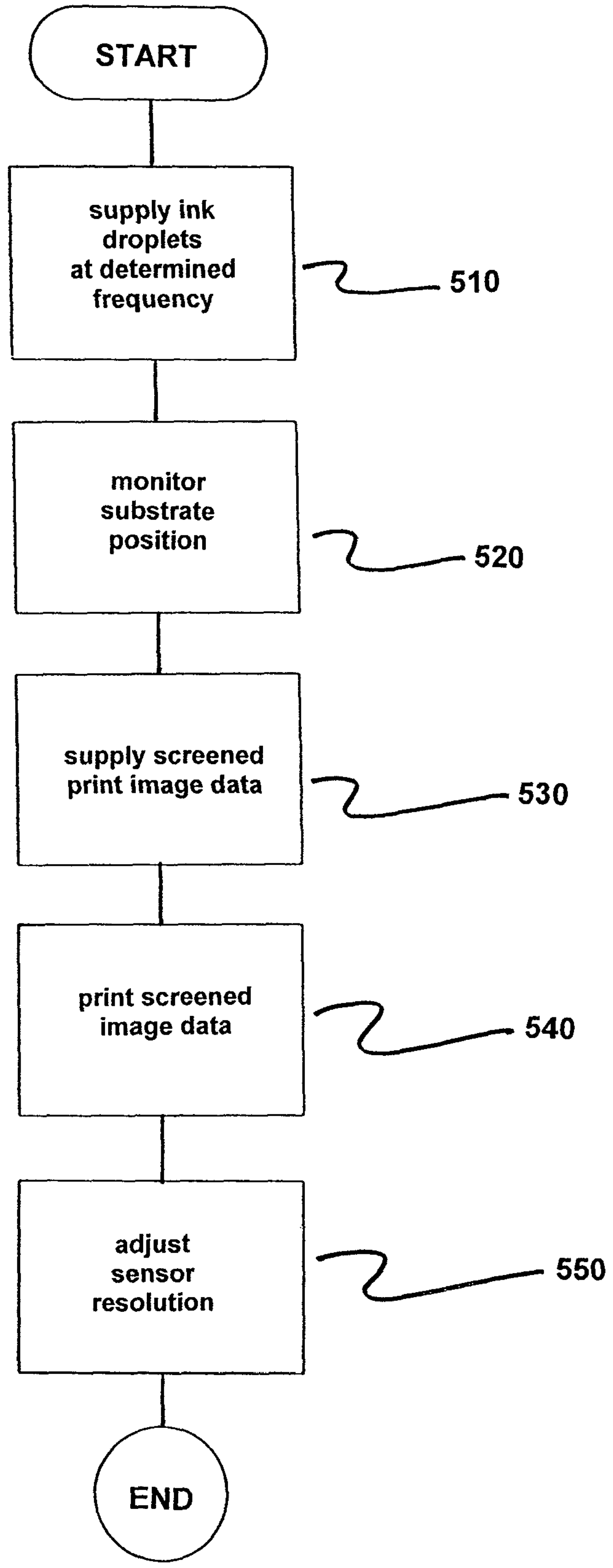
FIG. 5 is a flow chart of the method in accordance with an alternative embodiment of the invention.

FIG. 5 is a flow chart of the method in accordance with another embodiment of the invention. Initially, ink droplets are supplied at a determined droplet generating frequency from the inkjet printing device, as indicated in step 510. A position of the substrate to be imprinted relative to the inkjet printing device is monitored at a sensor to generate an actuating signal for the inkjet printing device, as indicated in step 520. Print image data which are screened with different resolutions are supplied for each substrate area to be imprinted, as indicated in step 530. Image data, which are screened with a determined resolution for the respective speed, are printed depending on a speed of the substrate to be imprinted, as indicated in step 540. The resolution of the sensor is adjusted to the resolution of the screened print image data, as indicated in step 550.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling an inkjet printing device working in accordance with a continuous inkjet principle so that a print image to be printed by the inkjet printing device can be printed on a print-material, the method comprising:

supplying ink droplets at a determined droplet generating frequency from the inkjet printing device;

monitoring, by a sensor, a position of the print-material to be printed upon relative to the inkjet printing device to generate an actuating signal for the inkjet printing device;

monitoring, by the sensor, an absolute position of the print-material;

coupling the actuating signal of the inkjet printing device for a subsequent print-material zone to be printed upon with the high print quality with the droplet generating frequency upon detecting at the sensor a start of a print-material zone to be printed upon with the high print quality; and coupling the actuating signal of the inkjet printing device for a subsequent print-material zone which is not to be printed upon or a print-material zone which is to be printed upon with a low print quality with a sensor signal when the sensor detects an end of the print-material zone to be printed upon with the high print quality.

2. The method according to claim 1, wherein, for every print-material zone to be printed upon with the high print quality such that the frequency of the actuating signal corresponds to the droplet generating frequency, the actuating signal of the inkjet printing device is coupled with a droplet generating frequency.

3. The method according to claim 1, wherein, for every print-material zone to be printed upon with the high print quality, the actuating signal of the inkjet printing device is coupled with the droplet generating frequency such that a frequency of the actuating signal is coupled with the droplet generating frequency by a unit fraction ratio.

4. The method according to claim 1, wherein, for each print-material zone to be printed upon with the high print quality, the actuating signal of the inkjet printing device is coupled with the droplet generating frequency such that a frequency of the actuating signal is coupled with the droplet generating frequency by a ratio of a proper fraction.

5. The method according to claim 1, wherein, for each print-material zone which is not to be printed upon or for each print-material zone to be printed upon with the low printing quality, the actuating signal of the inkjet printing device is coupled with the sensor signal such that a frequency of the actuating signal corresponds to the frequency of the sensor signal.

6. The method according to claim 1, wherein the sensor comprises an encoder.

7. A method for controlling an inkjet printing device working in accordance with a continuous inkjet principle so that a print image to be printed by the inkjet printing device can be positioned on a print-material, the method comprising:

supplying ink droplets from the inkjet printing device at a determined droplet generating frequency;

monitoring, by a sensor, a position of the print-material to be printed upon relative to the inkjet printing device to generate an actuating signal for the inkjet printing device;

supplying print image data sets which are screened with different resolutions for each area of the print-material to be printed upon;

depending on a speed of the print-material to be printed upon, print based on a selected image data set of the print image data sets that is screened with a determined resolution for a respective speed; and adjusting a resolution of the sensor to the resolution of the selected print image data set.

8. The method according to claim 7, wherein the sensor comprises an encoder.

* * * * *